United States Patent [19]

Schott

[11] 4,177,389

[45] Dec. 4, 1979

[54] POWER SUPPLY SYSTEM WITH TWO REGULATED POWER SUPPLY DEVICES CONNECTED IN PARALLEL AT AN OUTPUT

[75] Inventor: Heinrich Schott, Munich, Fed. Rep. of Germany

[73] Assignee: Siemens Aktiengesellschaft, Berlin & Munich, Fed. Rep. of Germany

[21] Appl. No.: 846,362

[22] Filed: Oct. 28, 1977

[30] Foreign Application Priority Data

Oct. 28, 1976 [DE] Fed. Rep. of Germany ....... 2649087

[51] Int. Cl.² .............................................. G05F 1/64
[52] U.S. Cl. ........................................ 307/64; 307/44; 307/53; 307/86; 323/20; 323/25
[58] Field of Search ....................... 307/64, 44, 53, 55, 307/65, 58, 86; 323/20, 25

[56] References Cited

U.S. PATENT DOCUMENTS 4,035,716  7/1977  Hutchinson ............................ 307/64

OTHER PUBLICATIONS

Regelungstecknik, Issue 10, vol. 8, 1960, p374.

Primary Examiner—L. T. Hix
Assistant Examiner—S. D. Schreyer
Attorney, Agent, or Firm—Hill, Van Santen, Steadman, Chiara & Simpson

[57] ABSTRACT

A power supply system is disclosed having two regulated power supply devices with outputs connected in parallel for redundant half-load operation. Each power supply device has a voltage regulator and a current regulator with outputs connected in parallel to a switching transistor which provides regulation. A discriminator and transfer switch in each power supply device compares sensed load currents in both the power supply devices and switches the power supply device from current regulation to voltage regulation or vice-versa. By use of the transfer switch and discriminator, an active, reaction-free load take over in the case of a failure of one of the power supply devices operating in a voltage regulation mode may be accomplished. The other power supply device is then switched from a current regulation mode to a voltage regulation mode so as to take over from the power supply device which has failed.

9 Claims, 3 Drawing Figures

POWER SUPPLY SYSTEM WITH TWO REGULATED POWER SUPPLY DEVICES CONNECTED IN PARALLEL AT AN OUTPUT

BACKGROUND OF THE INVENTION

The invention relates to a power supply system consisting of two regulated power supply devices connected in parallel at an output side. One of the power supply devices is constant-voltage regulated, using an apparatus comparing the load currents of the power supply devices.

A circuit arrangement of this type is already known (Regelungstecknik, Issue 10, Vol. 8, 1960, page 374). This circuit arrangement represents a circuit for the equal load regulation of firing-angle controlled rectifier devices which are connected in parallel at the output side. The controlled output resistance of a transistor stage, which carries out a comparison of the measurement voltages derived from the load currents of the two rectifier devices, intervenes in the voltage-dependent firing angle control of the second rectifier device.

SUMMARY OF THE INVENTION

This invention has the underlying objective, should the power supply system fail, of avoiding an interruption in the power supply to connected consumers, without switching over to a replacement power supply device. In this way, especially in the case of low output voltages and high output currents, an impermissibly large voltage breakdown is avoided.

The above objective is accomplished with this invention by providing power supply devices which function in redundant half-load parallel operation, in such a way that both power supply devices have, at the output side, a directly parallel-connected switching system for current and voltage regulation with an apparatus for switching over from current regulation to voltage regulation. In the event of a failure of one power supply device, an automatic, reaction-free load takeover occurs by the second power supply device if need be after switching over to voltage-regulating operation and signalling of the device failure.

The decision as to which of the two power supply devices takes over the function of voltage regulation or, respectively, current regulation, cannot be made in advance by the wiring of the current supply devices, because both devices must be equivalent and must, as a single device, always be operated with voltage regulation. According to an advantageous further development of the invention, the switching over from current regulation to voltage regulation or, respectively, vice versa, and the signalling of a disruption occurs as a function of a comparison of the rectified and filtered measuring voltages derived from the load currents of the two current supply devices. This occurs by use of a discriminator for each supply device and a succeeding transfer switch for each and controlled by each discriminator. In case of switching off or disruption of the other power supply device, the respectively current-regulated power supply device must be instantaneously switched over to voltage regulation. The prerequisite for an interruption-free takeover of the voltage regulation function is, in this situation, that the RC feedback of the voltage regulator is kept in an operation-like state, although the voltage regulator itself must be switched off during the current regulation.

In order to ensure that the necessary links between the control components of the two power supply devices are absolutely reaction-free, the control parts are constructed, according to a further refinement of the invention, in such a way that the output of the discriminator controlled change-over or transfer switch of each power supply device is connected to the current regulator circuit and the voltage regulator circuit of its own power supply device, and that the input of the transfer switch of the one power supply device is connected to the input of the transfer switch of the other power supply device via one voltage divider each. Accordingly, each of the power supply devices functioning in parallel operation has a circuit for current and voltage monitoring associated with it, into which the transfer switch can intervene in such a way that in the voltage-regulated power supply device the current monitoring is blocked and in the current-regulated power supply device the voltage monitoring is turned off.

Therefore, even with the power supply device turned off and the auxiliary voltage on the control unit lacking, flawless switching over and functioning of the remaining power supply device is guaranteed. There occurs an influencing of the input of both discriminators by a passive circuitry whose effect is negated, in normal operation of the power supply devices, by an active circuitry.

The respectively existing assignment of voltage regulation and current regulation to the power supply devices must be exchangeable, without effect on operations, when a special testing device for checking the control devices is turned on in the current-regulated power supply device. A change in the output voltage of the power supply system in half-load parallel operation is only possible if or when the influenced control unit has taken over the voltage regulation.

DETAILED DESCRIPTION OF THE PREFERRED EMBODIMENTS

Figure 1:
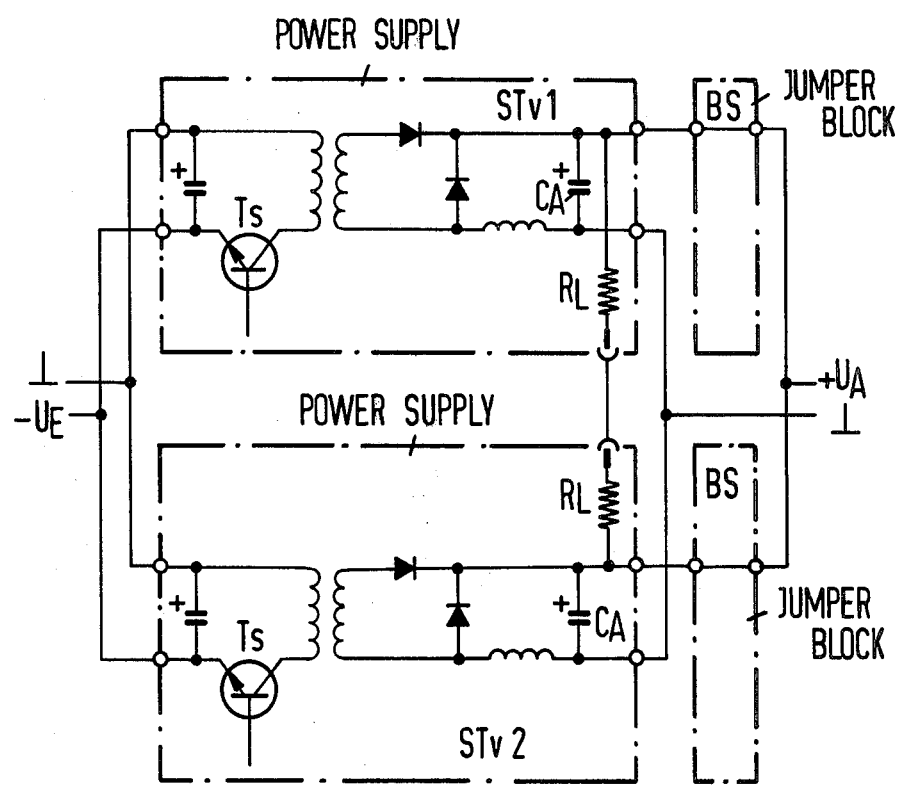
FIG. 1 is a schematic diagram generally illustrating the parallel connection of two regulated power supply devices Stv1 and Stv2.

The power sections of the power supply devices Stv1 and Stv2 represented in FIG. 1 are embodied as single phase flow converters. The associated control sections are not represented. The invention is not limited to single phase flow converters used in the sample embodiment. Any other regulated power supply device can also take their place.

The power sections of the current supply device Stv1 and Stv 2 represented in FIG. 1 are directly connected in parallel to ground. The plus terminals are connected together via two jumper plugs BS. The power section and the associated bridge plug are constructionally embodied in such a way that taking out and putting in the power section is not possible until after removing the associated bridge plug BS. By means of this measure, it is assured that, when the power section is plugged in, an output capacitor $C_A$ is first charged via two resistors $R_L$ without reaction effects on the users of the supply. As a consequence of its small intrinsic consumption, the jumper plug can then be put in without noteworthy equalizing current, and subsequently the power section can be put into operation.

Figure 2:
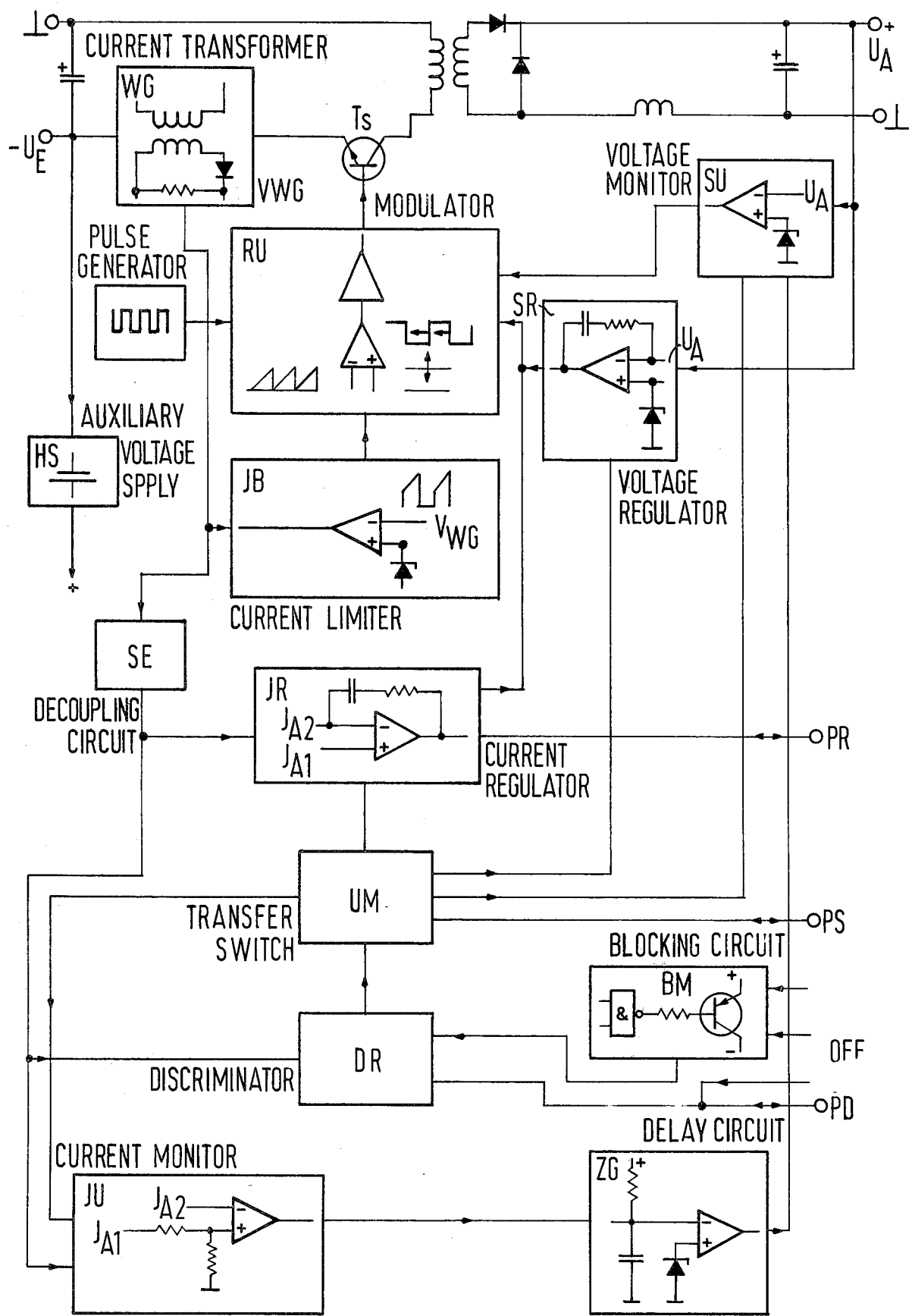
FIG. 2 shows a functional block diagram of a regulated power supply device complete with control section.

In the block circuit diagram illustrated in FIG. 2, the basic components which the regulated single-phase flow converter of this invention requires in operation as well as the additional control components necessary for the parallel operation of two power supply devices are represented.

The individual block circuit diagrams represented in FIG. 2 represent components whose structure and mode of operation are well-known to a person skilled in this art. Functions for the blocks are set forth below; additional explanations for some of the blocks are given in the descriptions relating to FIG. 3 hereafter.

Figure 3:
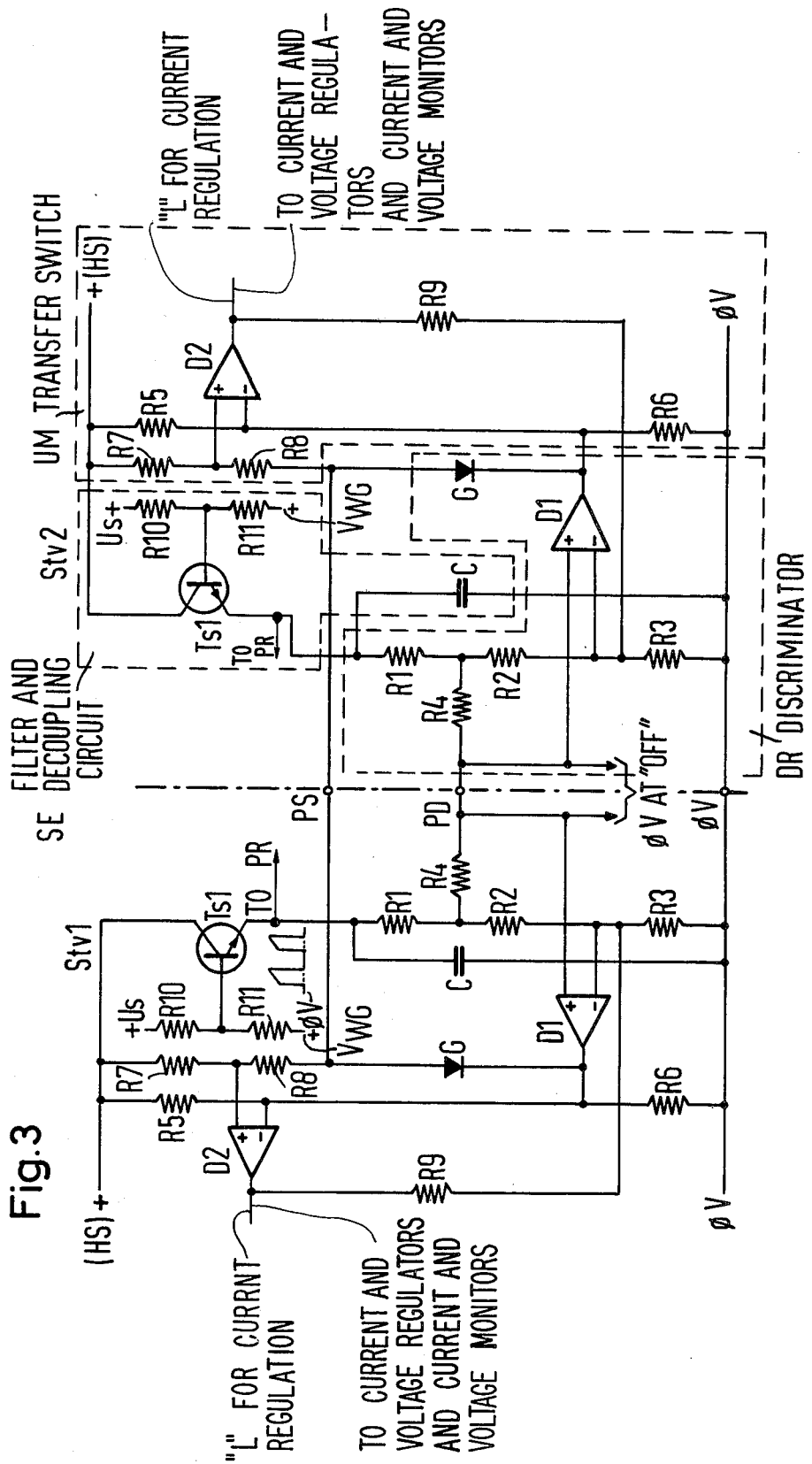
FIG. 3 is a schematic diagram of circuit details for a portion of the control section.

| | |
|---|---|
| Modulator RU | Modulator with following flip-flop and output amplifier (anolog regulator output voltage - sawtooth voltage comparison, storage and amplification); |
| Pulse generator TG | Bistable multivibrator, oscillator; |
| Voltage regulator SR | Comparator circuit with operational amplifier (desired value - actual value comparison); |
| Current-limiting apparatus JB | Comparator circuit (threshold value switch, maximum allowable current momentary-value); |
| Current transformer with rectifier WG | Current transformer with single-way rectifier and load resistor (momentary-value sampling of collector current in switching transistor); |
| Voltage monitoring apparatus SU | Comparator circuit (threshold value switch, maximum allowable output voltage deviation); |
| Auxiliary voltage supply HS | Regulated voltage converter; |
| Current regulator JR | Comparator circuit with operational amplifier (current value comparison between voltage regulated Stv - current regulated Stv); |
| Current monitoring circuit JU | Comparator circuit (threshold value switch, desired value - actual value comparison); |
| Delay circuit ZG | RC time delay with following threshold value switch |
| Blocking circuit BM | Logic linking circuit for switching over the current voltage regulation in dependance upon special operating conditions |
| Decoupling circuit SE | See FIG. 3; |
| Discriminator circuit DR | See FIG. 3; |
| Transfer switch UM | See FIG. 3; |

A switching means for regulating includes a switching transistor Ts arranged in the primary circuit of the flow converter is periodically turned on and off by a modulator RU via a control circuit not illustrated. The signal supplied by a pulse generator TG to the modulator RU determines the working frequency and the maximum pulse width of the switching transistor. For the regulation of the output voltage by means of a voltage regulator SR the pulse width can be further decreased. In case of overload and short circuit at the output of the flow converter this control function (voltage regulation) passes over to a current-limiting apparatus JB which has fed to it, from a current transformer with rectifier WG, a momentary-value sampling of the collector current in the switching transistor Ts, as a measurement variable. In case of deviations of the output voltage $U_A$ a voltage monitoring apparatus SU responds and effectuates, via the regulating converter RU, the permanent blocking of the switching transistor Ts. For supplying the entire control section, an auxiliary voltage supply HS is present which is connected directly to the input voltage $U_E$.

For proper half-load parallel operation of the power supply devices Stv1 and Stv2 an expansion of the control functions with respect to the cooperation of the two power supply devices is necessary. In addition to the already described components of the control circuit of the flow converter, a filtering and decoupling circuit SE, a current regulating apparatus JR, a discriminator circuit DR, a transfer switch UM, a current monitoring circuit JU, a delay circuit ZG and a blocking circuit BM are necessary in each of the two power supply devices. Since one of the two parallel-connected power supply devices must always function in voltage-regulating or, respectively, current-regulating operation in each case, and these functions cannot be established in advance by a corresponding wiring, a current regulation circuit JR is also necessary in each power supply device. In contrast to the voltage regulator SR it is not possible to prescribe a fixed reference value for the current regulator JR; as a desired value it must use the current respectively emitted by the voltage-regulated power supply device. For this purpose pulses supplied by the current converter WG which are proportional to the collector current of the switching transistor Ts are utilized. In order to avoid an arithmethic addition of the input-side alternating current and its reaction on the input voltage, synchronous operation of the pulse generators TG of the two power supply devices is not employed. In a filter circuit SE which serves simultaneously for decoupling, a filtered direct voltage is derived from the current pulses, which voltage can be compared, via a connecting line PR, to the voltage correspondingly generated in the other power supply device and can be used for controlling the current regulator JR. The decoupling and a sufficient elimination of feedback with respect to the momentary-value current-limitation occurs by use of a transistor Ts1 (FIG. 3), which simultaneously permits a working point shift and, thereby, an increase in the current regulation range.

So that a flawless transfer of the second power supply device from current to voltage regulation is assured in case of a disruption because of failure of the current supply device performing the voltage regulation, the outputs of the current regulator JR and of the voltage regulator SR must be directly connected in parallel in both power supply devices.

The determination of the type of operation of the two power supply devices with regard to their function as voltage or current regulating circuits is carried out by a discriminator DR. The decision is derived from the direct voltage generated via the current transformer WG and the filter circuit SE, said direct voltage also being used for the current regulation. The comparison is done with a voltage divider via a second connecting line PD between the control sections of the two power supply devices. The criterion obtained herefrom is, however, not unequivocal on large, widely fluctuating changes in the user current, since in case of a sudden unloading, for example, the current emission of both power supply devices becomes temporarily zero. In such dynamic occurrences it must be avoided that both power supply devices are simultaneously switched to current regulation, since the lack of voltage regulation will lead to deviation of the output voltage and ultimately to the total failure of the power supply devices. In order to guarantee the priority of the voltage regulation, the functions of discriminator and transfer switch are separated. For that purpose a connecting line PS is necessary between the transfer switches UM of the two power supply devices.

The circuits for the filter and decoupling circuit SE; discriminator DR; and of the transfer switch UM are described more specifically with the aid of FIG. 3. The input of the filter and decoupling circuit SE is formed by a voltage divider R10, R11 which is connected between a stabilized voltage $U_S$ and the pulse-shaped voltage $+V_{WG}$ delivered by the current transformer and rectifier WG. The decoupling transistor Ts1, whose base is at the top of the voltage divider, and a capacitor C effectuate the filtering and the decoupling. A comparator D1 performs the function of the discriminator DR and comparator D2 the function of the transfer switch UM. At the two inputs of the comparators D2 there is one voltage divider each R5, R6 or, respectively R7, R8. The voltage dividers R7, R8 of the two current supply devices Stv1 and Stv2 situated at the plus inputs of the comparators D2, are connected together via a connecting line PS. With proper dimensioning of the voltage divider resistors R5 and R8 and with open connecting lines PS and PD, the output of the comparator D2 always supplies what shall here be labeled an "H" signal, independent of whether the output of the discriminator D1 emits an H or L signal. The one of the two power supply devices whose comparator (transfer switch UM) conveys a positive voltage at the output (H-signal) takes over the voltage regulation in case of parallel operation of the two power supply devices. In case of individual operation of the power supply devices, the voltage regulation function is assured in any case. With a closed connecting line PD between the two power supply devices, and assuming a greater current emission by the power supply device Stv1, the comparator D1 (discriminator of current supply device Stv1) emits what shall be called here an "L" signal. At the output of the comparator D2 of the same power supply device, the H-signal is maintained, and the power supply device takes over the voltage regulation. Via a diode G and via the connecting line PS, the L-signal of the comparator D1 becomes operative also at the voltage divider R7, R8 and at the plus input of the comparator D2 in the power supply device Stv2. In the stable state the power supply device Stv2 will supply less current, and the output of the comparator D1 of the power supply device Stv2 will emit an H-signal. The potential at the minus input of the comparator D2 therefore becomes more positive than the potential at the plus input, and the output emits an L-signal. In this way the power supply device Stv2 is switched to current regulation. Via a feedback resistor R9, a hysteresis is generated for the comparator D1 which makes the discriminator less sensitive once the current regulation type of operation has established itself in power supply device Stv2.

In addition to determining the type of operation of the power supply device, the transfer switch UM in the additional control section of the power supply device also takes over the further interventions which are necessary because of the type of operation. As represented in the functioning wiring diagram in FIG. 2, one output of the transfer switch is connected to the current monitoring circuit JU and another output to the voltage monitoring circuit SU, so that, in the voltage regulation state the current monitoring circuit can be blocked, and, in case of current regulation, the voltage monitoring can be switched off or, respectively, the response tolerance can be expanded. The current monitoring circuit JU performs a prompt detection and exchange of a power supply device which, in current regulation operation, is delivering too little current in comparison to the current emission of the voltage regulated device. The current monitoring circuit JU uses as a measurement variable the rectified and filtered direct voltage value derived from the load current for the current regulation circuit JR. By means of a response threshold generated by means of a bias voltage, the precision of the current regulation is taken into consideration and it is assured that in case of very small load, the current monitoring will not respond before the current regulation goes out of operation. In order to prevent an undesired response of the current monitoring circuit JU in case of dynamic occurrences which can temporarily lead to unequal load division, a delay circuit ZG is interposed in between the output of the current monitoring circuit and an input of the voltage monitor SU. If an error message from the current monitoring circuit JU is present for a sufficient time it is passed along by the delay circuit ZG to the evaluation circuit of the voltage monitor SU; and switching off as well as signalling is triggered, as in the case of a voltage error.

With the described functional circuit blocks, flawless parallel operation of the power supply devices is guaranteed. If the power supply devices are switched on together, the determination of voltage regulation or, respectively current regulation type of operation depends on sample spread. In a certain pair of power supply devices the same allocation of voltage regulation or, respectively, current regulation is always established. If the power supply devices are switched on one after another, then the first one turned on retains the voltage regulation, and the second power supply device assumes current regulation.

If the device which is on current regulation fails, then the other device takes over the full load, with a small dynamic voltage deviation. If, however, the power supply device which is operated on voltage regulation fails, then the current regulation of the other power supply device continues to orient itself based upon the current flow of the disrupted device. Accordingly, the common output voltage initially falls, until the voltage monitoring circuit SU, which is operative only in the disrupted device triggers the switching off thereof. This "Off" command is simultaneously the criterion for the influencing of both discriminator circuits DR via the connecting line PD (FIG. 2). The previously current-regulated device switches over to voltage regulation and takes over the user supply with a small dynamic voltage deviation. The influencing of the connecting line PD between the two discriminator circuits occurs by means of a passive circuitry action in a normal condition is negated by an active circuitry. In this manner the switching-over can be assured, even with failure of the auxiliary supply HS in the disrupted device.

The current supply devices have a plug for the connection of a special test device with which the output voltage can be altered and also the function of the voltage monitor can be checked. If the test device is plugged into the voltage-regulated device, then the voltage influencing is readily possible; but not, however, if the test device is connected to the current-regulated power supply device. The plugging in of the test device must therefore also influence the discriminator DR and effectuate a change in the operating conditions of voltage regulation-current regulation. The device which is switched over from current regulation to voltage regulation can then be influenced with the testing device. If this current supply device is turned off or if the voltage monitor SU responds, then the interruption-free takeover of the user supply occurs by means of the other power supply device, as in the event of trouble.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A power supply system comprising:
   (a) two regulated power supply devices having outputs connected in parallel for redundant half-load operation;
   (b) each power supply device having:
      (i) voltage regulator means and current regulator means with outputs connected in parallel to a switching means for regulating;
      (ii) discriminator means in each power supply device for comparing sensed load currents in both of the power supply devices and transfer switch means connected to the discriminator means for switching the power supply device from current regulation to voltage regulation or vice-versa by means of the voltage regulator means and current regulator means connected thereto; and
      (iii) said transfer switch means and discriminator means providing an active, reaction-free load takeover in the case of a failure of one of the power supply devices operating in a voltage regulation mode, the other power supply device being switched from a current regulation mode to a voltage regulation mode.

2. A power supply system according to claim 1, characterized in that the current regulator means of the power supply device operating in a current regulation mode uses as a reference variable a load current emitted by the other power supply device operating in the voltage regulation mode such that measurement voltages derived from the load currents in each of the current supply devices are compared with one another after rectification and filtering and decoupling by a decoupling means.

3. A power supply system according to claim 1, characterized in that the switching from current regulation to voltage regulation or vice versa by the transfer switch means occurs as a function of a comparison by the discriminator means in each power supply device of the rectified and filtered measurement voltages derived from the load currents of the two power supply devices.

4. A power supply system according to claim 1, characterized in that an output of the transfer switch means of each power supply device controlled by the discriminator means is connected to the current regulator means and the voltage regulator means of its own power supply device, and that an input of the transfer switch means of one of the power supply devices is connected to an input of the transfer switch means of the other power supply device via a voltage divider in each power supply device.

5. A power supply system according to claim 1, characterized in that means are provided for again establishing the half-load parallel operation after an exchange of a disrupted power supply and that the discriminator means together with the transfer switch means determine whether the exchanged power supply device functions in a voltage or current regulating mode.

6. A power supply system according to claim 1, characterized in that each of the power supply devices has a current monitoring means and a voltage monitoring means and that the transfer switch means in one of the power supply devices operating in a voltage regulating mode blocks the current monitoring means, and the transfer switch means in the other power supply device operating in a current regulating mode switches off the voltage monitoring means.

7. A power supply system according to claim 6, characterized in that a response of the current monitoring means is operative in a delayed way by insertion of a delay circuit means between an output of the current monitor means and an input of the voltage monitor means.

8. A power supply system according to claim 1, characterized in that the output parallel connection of the power supply devices is provided by means of a fixed connection between two output terminals of one polarity and a parallel circuit comprising at least one charging resistance and one jumper plug between output terminals of the other polarity, and that the power supply device and the jumper plug include means for preventing the removal and placement of the power supply device until after the jumper plug has been removed.

9. A power supply system comprising:
   (a) two substantially similar regulated power supply devices having outputs connected in parallel;
   (b) each power supply device having a switching means for regulating, current sensing means connected to the switching means, and a regulating control circuit means connected for controlling the switching means, said circuit control means comprising
      (i) a voltage regulator means and a current regulator means having their respective outputs connected to control the switching means;
      (ii) a discriminator means for comparing the load currents from the current sensing means in each power supply device;
      (iii) a transfer switch means controlled by the discriminator means and connected to the voltage regulator and current regulator means for activating one of the voltage and current regulators and deactivating the other of the regulators in response to an output from the discriminator means.

* * * * *